United States Patent
Bakodledis

(12)
(10) Patent No.: US 6,685,181 B2
(45) Date of Patent: Feb. 3, 2004

(54) PAPER DISPENSING MECHANISM

(75) Inventor: Andrew Bakodledis, Chester, CT (US)

(73) Assignee: GBR Systems Corporation, Chester, CT (US)

( * ) Notice: Subject to any disclaimer, the term of this patent is extended or adjusted under 35 U.S.C. 154(b) by 83 days.

(21) Appl. No.: 10/076,252

(22) Filed: Feb. 15, 2002

(65) Prior Publication Data

US 2003/0155701 A1 Aug. 21, 2003

(51) Int. Cl.[7] .................................................. B65H 3/44
(52) U.S. Cl. ...................... 271/9.03; 271/9.05; 271/9.08
(58) Field of Search ............................. 271/9.03, 9.05, 271/9.07, 9.08, 10.01, 10.06, 10.07, 147, 152, 123, 167, 171; 414/796.7, 797.2; 221/6, 11, 119, 123, 226, 231, 236, 244, 242

(56) References Cited

U.S. PATENT DOCUMENTS

| | | | | |
|---|---|---|---|---|
| 2,211,835 A | | 8/1940 | Peters | |
| 2,594,499 A | * | 4/1952 | Rumph | |
| 3,458,042 A | | 7/1969 | Mestre | |
| 3,938,697 A | | 2/1976 | Kinney | |
| 4,024,963 A | | 5/1977 | Hautau | |
| 4,108,427 A | | 8/1978 | Komori | |
| 4,143,776 A | | 3/1979 | Meyers | |
| 4,252,484 A | | 2/1981 | Benson | |
| 4,412,631 A | * | 11/1983 | Haker | |
| 4,416,577 A | | 11/1983 | Inaba | |
| 4,451,191 A | | 5/1984 | Torre | |
| 4,462,585 A | | 7/1984 | Gieson | |
| 4,633,604 A | * | 1/1987 | Adamson et al. | |
| 4,763,890 A | | 8/1988 | Zimmerman | |
| 4,784,422 A | | 11/1988 | Jones | |
| 4,878,705 A | | 11/1989 | Arnquist | |
| 4,921,397 A | | 5/1990 | Watanabe | |
| 5,002,267 A | | 3/1991 | Brecy | |
| 5,165,340 A | | 11/1992 | Karlyn | |
| 5,263,701 A | * | 11/1993 | Kleinhen | |
| 5,313,882 A | | 5/1994 | Karlyn | |
| 5,347,350 A | | 9/1994 | Nakahata | |
| 5,395,208 A | | 3/1995 | Mojden | |
| 5,549,444 A | | 8/1996 | Dubuit | |

* cited by examiner

Primary Examiner—David H. Bollinger
(74) Attorney, Agent, or Firm—Joseph J. Previto

(57) ABSTRACT

An article dispensing mechanism in which a plurality of stacks are mounted on a platform. Each has a plurality of articles such as paper sheets. The platform is moved from an article feeding position to a non-feeding position. An article feeding mechanism is mounted above a stack at the article feeding position. The article feeding mechanism feeds an article from the top of a stack at said article feeding position. When a stack at the article feeding position is devoid of articles, the platform is moved from the feeding position to the non-feeding position to present another stack to the feeding position.

24 Claims, 4 Drawing Sheets

PAPER DISPENSING MECHANISM

BACKGROUND

The present invention relates to a paper dispensing mechanism and more particularly to a paper dispensing mechanism which will feed sheets of paper from a stack.

Paper dispensing mechanisms have been in use for a number of years. They comprise feeding sheets of paper from stacks of paper to a post print paper handling mechanism. When the sheets of paper in a stack are exhausted, the stack must be replaced with a fresh one. This creates increased down time and increased handling expenses. It has also been found that some sheet feeding mechanisms are able to feed paper in one orientation only (e.g. parallel to the long edge) and are not able to feed paper in another orientation (e.g. parallel to the short edge), so that if it is desired to change the orientation of the paper being fed, a different feeding mechanism must be used. It has also been discovered that some sheet feeding mechanisms are able to deposit the fed sheets in single sheets only but cannot feed sheets in shingle fashion so that if sheets are to be fed in shingle fashion, a different feeding mechanism must be used. Furthermore, some sheet feeding mechanisms may be used only with certain types of other paper handling machines, such as printers, so that a separate feeding mechanism must be used to feed sheets to a different paper handling machine.

OBJECTS

The present invention overcomes these problems and has for one of its objects the provision for an improved sheet feeding mechanism in which separate stacks of sheets may be fed one after the other with very little or no down time.

Another object of the present invention is the provision of an improved sheet feeding mechanism in which sheets can be fed singly or in shingle form.

Another object of the present invention is the provision of an improved sheet feeding mechanism which can be used with a variety of other paper handling machines.

Another object of the present invention is the provision of an improved sheet feeding mechanism which may be moved from one paper handling mechanism to another.

Another object of the present invention is the provision of an improved sheet feeding mechanism which is able to feed sheets in different orientations.

Another object of the present invention is the provision of an improved sheet feeding mechanism which can feed sheets of different sizes.

Another object of the present invention is the provision of an improved sheet feeding mechanism which is simple and inexpensive to operate, maintain and manufacture.

Other and further objects of the invention will be obvious upon an understanding of the illustrative embodiment about to described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein.

DESCRIPTION

Figure 1:
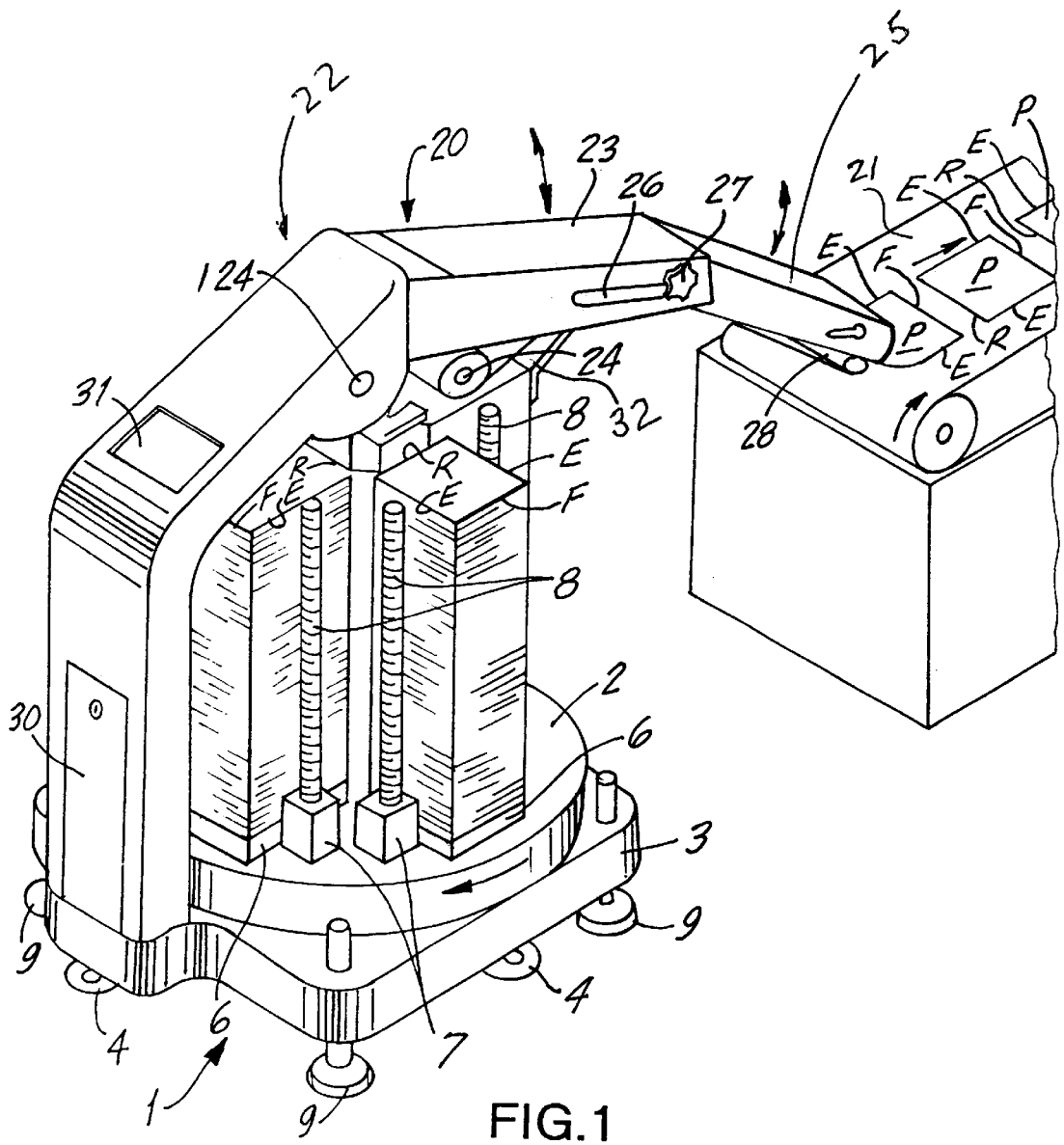
FIG. 1 is a perspective view of the sheet feeding mechanism of the present invention.
Figure 2:
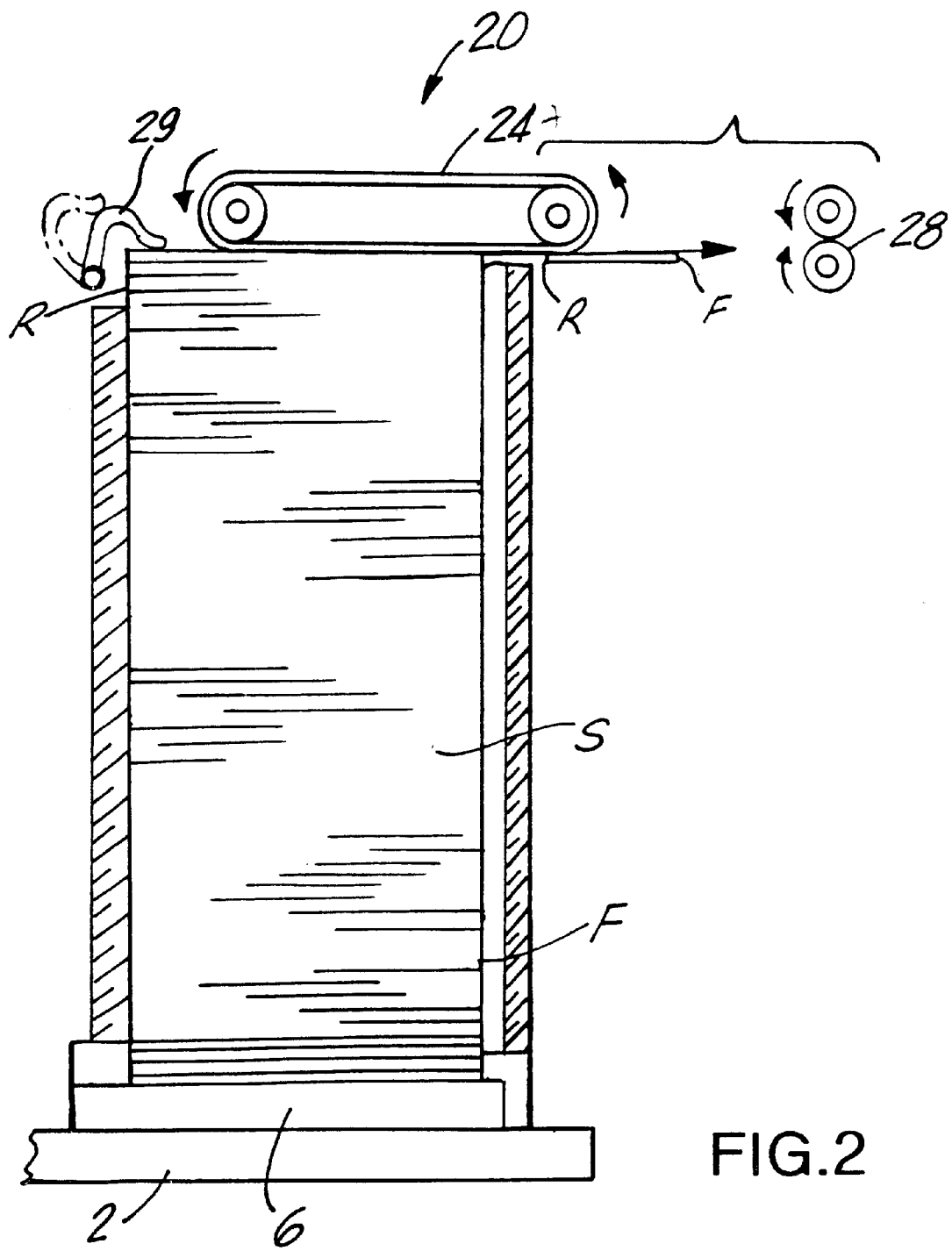
FIG. 2 is a diagrammatic side elevational view showing feeding of sheets from one of the stacks.

Referring to the drawings, the dispensing mechanism 1 of the present invention comprises a plurality of stacks S of sheets of paper P (four shown in the drawings) mounted on a rotatable platform 2. Each paper sheet P has a front edge F, a rear edge R and side edges E. The rotatable platform 2 is mounted on a trolley 3 which has rollers 4 so that the dispensing mechanism can be moved around from one position to another. Casters 9 are also provided to permit the dispensing mechanism to be held on the floor at a particular location. Each stack S of paper P is held in place by adjustable guides 5 (four shown in FIG. 4 and two shown in FIG. 3). It will be seen from FIG. 3 that sheets may be fed either parallel to the longer edge or may be fed parallel to the shorter edge depending on the paper orientation of the stack. It is also possible for sheets of different sizes to be placed in different stacks (FIG. 3) and be fed by the same feeding mechanism.

Figure 3:
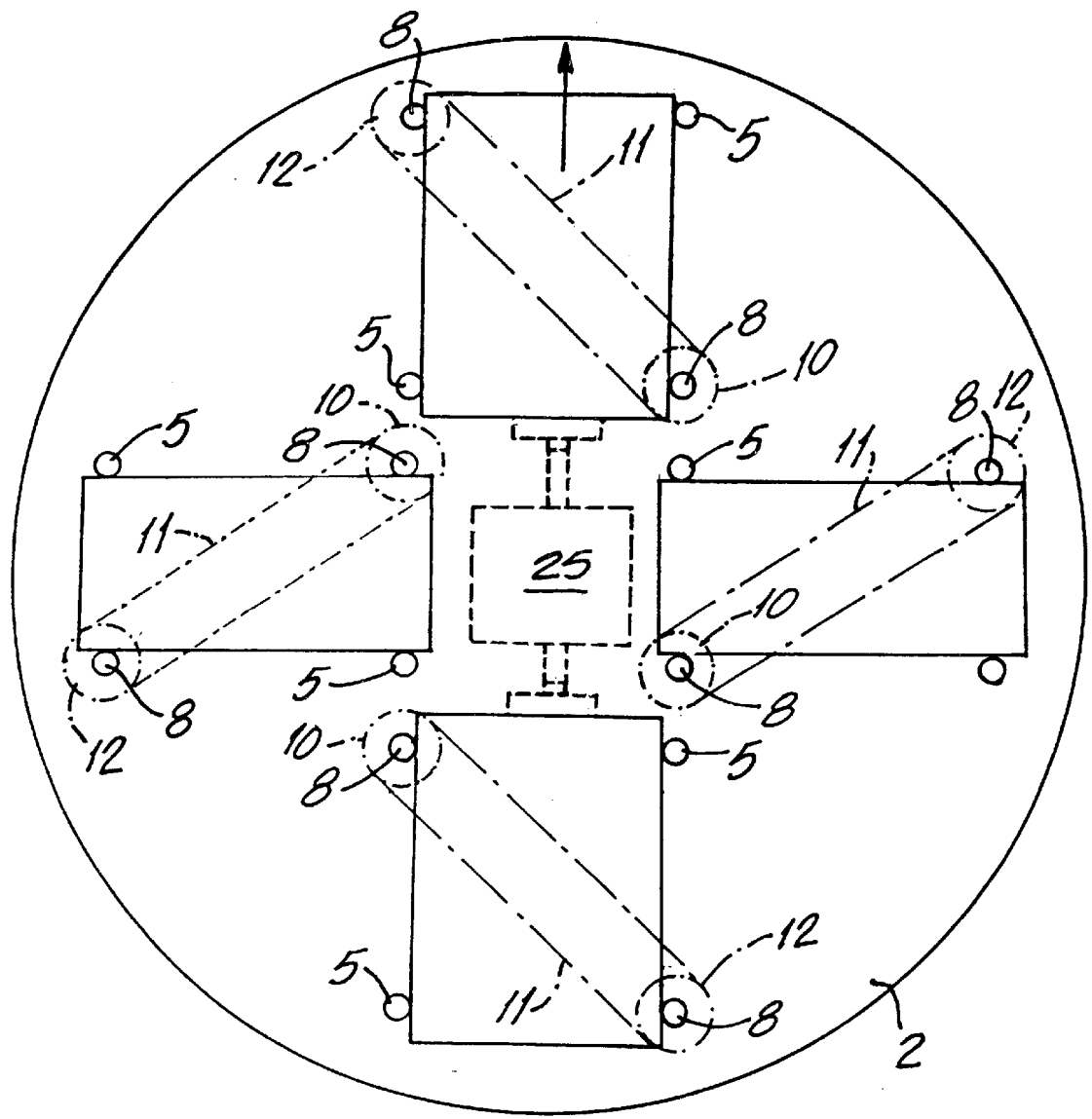
FIG. 3 is a schematic top view showing one feature of the present invention.
Figure 4:
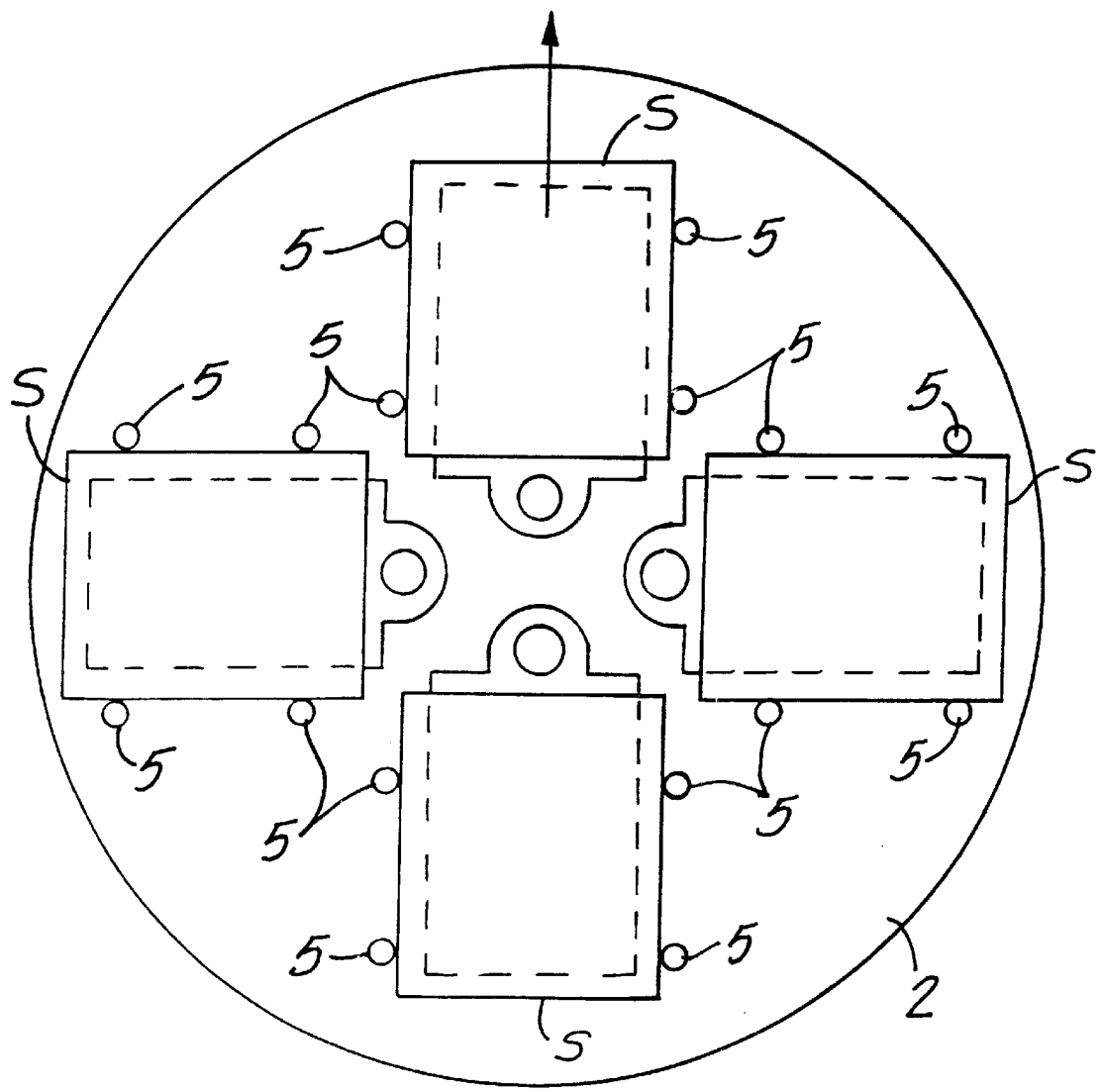
FIG. 4 is a schematic top view showing another feature of the present invention.

Each stack S of paper P is mounted on an elevator 6 which has elevator blocks 7 connected thereto through which screws 8 extend. When the elevator screws 8 are rotated, the elevator blocks 7 will be raised and the elevators 6 will also be raised. A pair of diagonally positioned elevator screws 8 are provided for each stack. Servomotors 10 are preferably used to rotate the elevator screws 8. As shown in FIG. 3, the servomotors 10 are connected to gears 12 by chain 11 so that the servomotors rotate both elevator screws 8 simultaneously. It will be understood that more or less than the two elevator screws 8 shown may be used without departing from the invention. It will also be understood that other mechanisms may also be used to raise the elevators 6 or rotate the elevator screws 8.

A sheet feeding assembly 20 is mounted above the stack S and is adapted to remove sheets P from the top of each stack S one at a time. The sheets P are deposited on a take-off conveyor 21 to be moved thereby to another paper handling machine (not shown). The sheet feeding assembly 20 comprises a frame 22 having a pick-up arm 23 pivotally mounted thereto at 124, and a delivery arm 25 pivotally and extendably connected to the pickup arm 23. A delivery pinch roller assembly 28 is connected to and moves with the delivery arm 25. The delivery arm 25 is connected to the pick up arm 23 through a slot 26 and lock screw 27 to permit the pick up arm 25 to move upwardly relative to the pick up arm 23 and to move lengthwise thereof. A spring-pressed hold down retard finger 29 is provided at the top in order to hold the next sheet down after the top sheet is fed so that no more than a single sheet is fed at a time. When the top sheet is fed, the hold down retard finger 29 keeps the next lower sheet down and the rest of the stack in place. A movable stack guide 32 at the top of stack S assists in feeding sheets into the sheet feeding assembly 20.

At the sheet feeding position beneath the sheet feeding assembly 20, as each sheet is removed from the top of the stack, detection means (not shown) will sense this and will cause the elevator screws 8 to be rotated by the servomotors 8 to raise the elevator 6 and the stack of sheets upwardly so that the next sheet P is now the topmost sheet P and can be fed individually. When all the sheets P in a stack S are exhausted and the stack S is empty, detection means (not shown) detects this and means are activated to rotate or index 90 degrees so that the empty stack is moved away from under the sheet feeding assembly 20 at the sheet feeding position to a non feeding position and a new stack is presented under the sheet feeding assembly 20 at the sheet feeding position. In this position sheets S can continue to be fed from the new stack S and the empty stack can be loaded with new sheets at the same time that the sheets are being fed from the stack under the sheet feeding assembly 20. The platform 2 may be rotated in index fashion by a lower indexing wheel assembly 25 below the platform 2. However, it will be understood that other mechanism may be used to rotate the platform 2 without departing from the invention.

The controls (electronic or otherwise) for the sheet feeding assembly 20 may be provided in a compartment 30 in the frame 22 which may also have a Operator Control Panel 31. As stated above, the pick up arm 23 is adjustable vertically around pivot 124 and the delivery arm 25 is adjustable vertically and horizontally relative to pick up arm 23 by lock screw 27 and slot 26. The conveyor 24 feeds each sheet S to pinch rollers 28 which in turn deposit each sheet S to a take off conveyor 21 for transport to another paper handling machine (not shown). The height of each arm 23 and 25 is independently adjustable relative to the take off conveyor 21. If it is desired to deposit the sheets P on the take off conveyor 21 in a pattern of separate single sheets, the delivery arm 23 is moved to the proper position and the sheets are deposited singly, as shown in FIG. 1. If it is desired to deposit the sheets P on the conveyor 21 in shingle fashion, the delivery arm 23 is moved to a position so that the sheets S are deposited on the conveyor 21 in shingle fashion (not shown in the drawing).

It will be seen that the present invention provided an improved sheet feeding mechanism in which separate stacks of sheets may be fed one after the other with very little or no down time, in which sheets can be fed singly or in shingle form, which can be used with a variety of other paper handling machines, which may be moved from one handling mechanism to another, which is able to feed sheets in different orientations and in different sizes and which is simple to operate, maintain and manufacture.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. An article dispensing mechanism comprising a platform, a plurality of stacks mounted on said platform, each of said stacks having a plurality of articles therein, means for moving the platform from an article feeding position to a non-feeding position, an article feeding mechanism mounted above a stack at said article feeding position, said article feeding mechanism having means to feed an article from the top of a stack at said article feeding position, means for detecting when a stack at said article feeding position is devoid of articles, means responsive to said detecting means for moving said platform from said feeding position to said non-feeding position and to present another stack to said feeding position, means are provided to raise the articles in the stack after the article at the top of a stack has been fed by the article feeding mechanism, said raising means comprises an elevator on said platform on which a stack is mounted and wherein means are provided to raise said elevator after an article has been fed from the top of the stack, an elevator block is operatively connected to said elevator and wherein an elevator screw is provided which is operatively connected to said elevator block.

2. An article dispensing mechanism as set forth in claim 1 wherein means are provided for rotating the elevator screw to lift the elevator block and the elevator.

3. An article dispensing mechanism as set forth in claim 2, wherein means are provided to apply pressure to the top of the stack when the topmost article in said stack is being fed.

4. An article dispensing mechanism as set forth in claim 3, wherein said article feeding mechanism comprises an arm assembly above said stack and movable relative to said stack.

5. An article dispensing mechanism as set forth in claim 4, wherein an elevator is provided for each of said stacks on said platform.

6. An article dispensing mechanism as set forth in claim 5, wherein said platform is a rotatable platform.

7. An article dispensing mechanism as set forth in claim 6 wherein said platform is mounted on a base having a frame which extends from said base and wherein said arm assembly comprises a pick-up arm operatively associated with said frame.

8. An article dispensing mechanism as set forth in claim 7, wherein said arm assembly comprises a delivery arm operatively associated with said pick-up arm.

9. An article dispensing mechanism as set forth in claim 8, wherein a plurality of elevator screws are provided for each stack and means are provided for simultaneously rotating said elevator screws.

10. An article dispensing mechanism as set forth in claim 9, wherein said base comprises a movable trolley.

11. An article dispensing mechanism as set forth in claim 10 wherein guides are provided to hold the stacks in place.

12. An article dispensing mechanism as set forth in claim 11, wherein said guides are adjustable.

13. An article dispensing mechanism comprising a platform for receiving article, a plurality of stacks having a plurality of articles therein, means for moving the platform from an article feeding position to a non-feeding position, an article feeding mechanism mounted at said article feeding position, means for detecting when a stack at said article feeding position is devoid of articles, means responsive to said detecting means for moving said platform from said feeding position to said non-feeding position and to present another stack to said feeding position, means are provided to raise articles in a stack after one article on top of a stack has been fed by the article feeding mechanism, said raising means comprises an elevator on said platform for receiving a stack and wherein means are provided to raise the elevator after an article has been fed from the top of a stack, an elevator block is operatively connected to said elevator and wherein an elevator screw is provided which is operatively connected to said elevator block.

14. An article dispensing mechanism as set forth in claim 13 wherein means are provided for rotating the elevator screw to lift the elevator block and the elevator.

15. An article dispensing mechanism as set forth in claim 14 wherein means are provided to apply pressure to the top of a stack when the topmost article in a stack is being fed.

16. An article dispensing mechanism as set forth in claim 15, wherein said article feeding mechanism comprises an arm assembly.

17. An article dispensing mechanism as set forth in claim 16, wherein a plurality of elevators is provided for receiving a plurality of stacks.

18. An article dispensing mechanism as set forth in claim 17, wherein a plurality of elevator screws are provided for each stack and means are provided for simultaneously rotating said elevator screws.

19. An article dispensing mechanism as set forth in claim 18, wherein said base comprises a movable trolley.

20. An article dispensing mechanism as set forth in claim 16 wherein said platform is a rotatable platform.

21. An article dispensing mechanism as set for in claim 20 where said platform is mounted on a base having a frame which extends from said base and wherein said arm assembly comprises a pick-up arm operatively associated with said frame.

22. An article dispensing mechanism as set forth in claim 21 wherein said arm assembly comprises a delivery arm operatively associated with said pick-up arm.

23. An article dispensing mechanism as set forth in claim 21 wherein guides are provided to hold 11 stacks in place.

24. An article dispensing mechanism as set forth in claim 23, wherein said guides are adjustable.

* * * * *